United States Patent
Schumann et al.

(10) Patent No.: US 11,415,789 B2
(45) Date of Patent: Aug. 16, 2022

(54) MICROSCOPE AND METHOD FOR DETERMINING AN ABERRATION IN A MICROSCOPE

(71) Applicant: Leica Microsystems CMS GmbH, Wetzlar (DE)

(72) Inventors: Christian Schumann, Lich (DE); Alexander Weiss, Linden (DE); Andreas Lotter, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 140 days.

(21) Appl. No.: 17/080,874

(22) Filed: Oct. 27, 2020

(65) Prior Publication Data

US 2021/0124160 A1 Apr. 29, 2021

(30) Foreign Application Priority Data

Oct. 29, 2019 (EP) .................................... 19205882

(51) Int. Cl.
*G02B 21/00* (2006.01)
*G02B 21/24* (2006.01)
*G02B 27/00* (2006.01)
*G02B 21/34* (2006.01)

(52) U.S. Cl.
CPC ....... *G02B 21/008* (2013.01); *G02B 21/0072* (2013.01); *G02B 21/242* (2013.01); *G02B 27/0025* (2013.01); *G02B 21/34* (2013.01)

(58) Field of Classification Search
CPC .............. G02B 21/008; G02B 21/0072; G02B 21/242; G02B 27/0025; G02B 21/34; G02B 21/00; G02B 21/0004; G02B 21/002; G02B 21/0032; G02B 21/0088; G02B 21/06; G02B 21/245; G02B 21/36; G02B 21/361
USPC ....... 359/368, 362, 363, 369, 385, 387, 388, 359/390
See application file for complete search history.

(56) References Cited

U.S. PATENT DOCUMENTS

| | | | |
|---|---|---|---|
| 6,563,634 B2 | 5/2003 | Shimada et al. | |
| 7,825,360 B2 | 11/2010 | Karasawa et al. | |
| 9,411,142 B2 | 8/2016 | Ue et al. | |
| 2006/0291039 A1* | 12/2006 | Eda ........................ | G02B 21/02 359/362 |

(Continued)

FOREIGN PATENT DOCUMENTS

| | | |
|---|---|---|
| DE | 102011084562 B4 | 2/2018 |
| JP | 2011-102711 A | 5/2011 |
| WO | WO 2005/096062 A1 | 10/2005 |

*Primary Examiner* — Arnel C Lavarias
(74) *Attorney, Agent, or Firm* — Leydig, Voit & Mayer, Ltd.

(57) ABSTRACT

A microscope includes an optical imaging system with an adjustable corrector, a microscope drive, a position sensitive detector, an optical measuring system and a control unit. The optical measuring system configured to form first and second measuring light beams, direct the measuring light beams into an entrance pupil of the optical imaging system eccentrically with first and second distances to the optical axis thereof, receive first and second reflection light beams, and direct the reflection light beams onto the position sensitive detector. The control unit is configured to record positions of the reflection light beams on the position sensitive detector, and determine an aberration based on the recorded positions.

15 Claims, 8 Drawing Sheets

(56) References Cited

U.S. PATENT DOCUMENTS

| | | |
|---|---|---|
| 2013/0094016 A1 | 4/2013 | Knebel et al. |
| 2019/0186895 A1* | 6/2019 | Kalkbrenner ...... G02B 21/0088 |
| 2020/0409128 A1* | 12/2020 | Fahrbach ............. G02B 21/006 |

* cited by examiner

MICROSCOPE AND METHOD FOR DETERMINING AN ABERRATION IN A MICROSCOPE

CROSS-REFERENCE TO PRIOR APPLICATION

Priority is claimed to European Patent Application No. EP19205882.4, filed on Oct. 29, 2019, the entire disclosure of which is hereby incorporated by reference herein.

FIELD

The present invention relates to a microscope. Further, the present invention relates to a method for determining an aberration in a microscope.

BACKGROUND

The main influence on the quality of a microscopic image of a specimen are spherical aberrations caused by the specimen, in particular, spherical aberration induced by a cover slip or refractive index mismatch. The main causes for refractive index mismatch in biological microscopy are an inadequate optical thickness of the cover slip, an inadequate refractive index of the cover slip, or an inadequate refractive index of an optical medium in which the specimen is embedded.

In order to correct the spherical aberration caused by the specimen, conventional microscopes comprise adjustable correction means, also referred to as an adjustable corrector. These adjustable correction means typically comprise one or more lenses arranged in an objective and movable along the optical axis thereof. By moving the lenses along the optical axis, a spherical aberration is induced that counteracts the spherical aberration caused by the specimen. However, in order to counteract the spherical aberration caused by the specimen, it first needs to be determined.

Commonly applied methods for determining an aberration in a microscope make use of a model function that describes the optical properties of the microscope based on a number of input parameters. Such parameters include for example the thickness of the cover slip and the refractive index of the optical medium in which the specimen is embedded. These parameters can be determined in advance prior to a microscopic examination of the specimen or measured in situ, i.e. during the examination. The model function describes the optical properties of the optical measuring system and thus any aberration induced by the properties of the specimen that are entered into the model as a parameter. From the aberration determined in this way, a setting of the adjustable correction means can be determined.

U.S. Pat. No. 7,825,360 discloses a microscope comprising an objective with a correction collar and a method for correcting a spherical aberration caused in accordance with the optical thickness of a cover glass. For correcting the spherical aberration, the optical thickness of the cover glass is measured in a first step. The measured optical thickness is entered as a parameter into a function for calculating a manipulated value which is used to control the correction collar. The correction collar is then adjusted in accordance with the calculated value, thereby correcting the aberration induced by the optical thickness of the cover glass.

U.S. Pat. No. 6,563,634 B2 discloses a microscope comprising a correction lens for correcting aberrations, in particular the thickness of a cover glass, a petri dish or a microscope slide. This document also discloses a method for correcting the position of a focal plane of an objective lens using the correction lens.

U.S. Pat. No. 9,411,142 B2 discloses a method for adjusting a correction ring when focusing a microscope. The method is based on an interpolation of support points given by different settings of the correction ring that are defined by an operator. By means of this method, the setting of the correction ring can be adjusted for samples with a large refractive index variation. However, an exact evaluation and thus the determination of the interpolation points is time-consuming and requires an experienced operator. Furthermore, the above-mentioned method requires the generation of a large number of images, which is particularly disadvantageous for light-sensitive specimens, e.g. due to fading of fluorescence or phototoxicity.

However, the known microscopes rely on a model of the optical behavior of the optical imaging system thereof in order to determine a spherical aberration. In the microscope disclosed in U.S. Pat. No. 7,825,360 for example, only a thickness of the cover slip is used as an input parameter for the model, whereas other factors such as the refractive index of a medium in which a sample is embedded, a refractive index of the cover slip, or their temperature dependency remain disregarded. Thus, known microscopes do not determine the spherical aberration itself but only an approximation thereof which might not be accurate.

DE102011084562B4 discloses a device and method for the measurement of a spherical aberration in a microscope. The method is based on the optics of an autofocus system but utilizes the analysis of the intensity profile of only one reflected measurement beam. Thus, the method determines the impact of spherical aberration on the intensity profile but not the spherical aberration itself.

SUMMARY

In an embodiment, the present invention provides a microscope comprising an optical imaging system, a microscope drive, a position sensitive detector, an optical measuring system and a control unit. The optical imaging system has an adjustable corrector and is configured to image a specimen that has a cover slip. The microscope drive is configured to adjust a distance between the cover slip and the optical imaging system along an optical axis of the optical imaging system. The optical measuring system configured to: form a first measuring light beam and a second measuring light beam, direct the first measuring light beam into an entrance pupil of the optical imaging system eccentrically with a first distance to the optical axis of the optical imaging system, direct the second measuring light beam into the entrance pupil of the optical imaging system eccentrically with a second distance to the optical axis of the optical imaging system, the second distance being different from the first distance, receive a first reflection light beam that is created by a partial reflection of the first measuring light beam on a surface of the cover slip through the optical imaging system, receive a second reflection light beam that is created by a partial reflection of the second measuring light beam on the surface of the cover slip through the optical imaging system, and direct the first and second reflection light beams onto the position sensitive detector. The control unit is configured to: record positions of the first and second reflection light beams on the position sensitive detector, and determine an aberration based on the recorded positions of the first and second reflection light beams.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
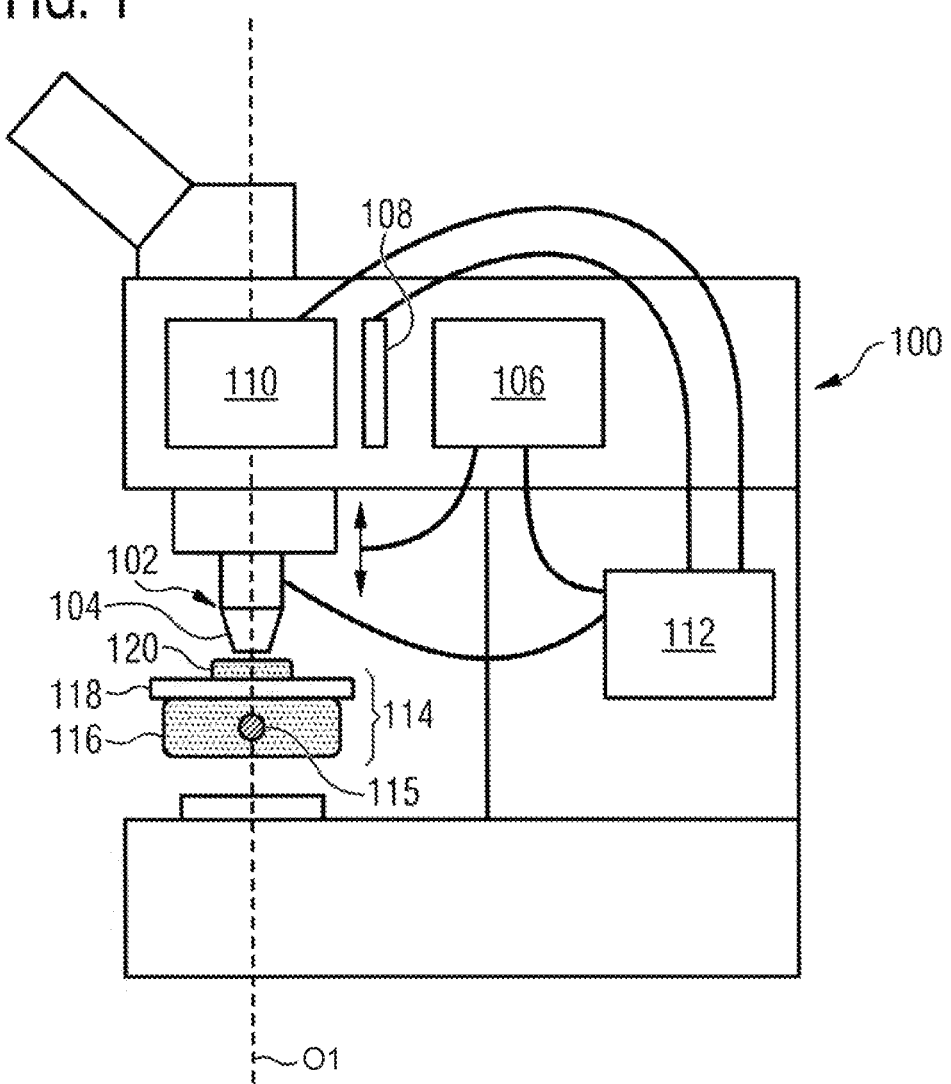
FIG. 1 is schematic diagram showing a microscope according to an embodiment.

In an embodiment, the present provides a microscope that allows for easy and accurate determination of a spherical aberration.

A microscope according to an embodiment of the present invention comprises an optical imaging system configured to image a specimen comprising a cover slip, said optical imaging system comprising adjustable correction means, a microscope drive configured to adjust the distance between the cover slip and the optical imaging system along the optical axis thereof, a position sensitive detector, an optical measuring system, and a control unit. The optical measuring system is configured to form a first measuring light beam and a second measuring light beam, to direct the first measuring light beam into an entrance pupil of the optical imaging system eccentrically with a first distance to the optical axis thereof, and to direct the second measuring light beam into the entrance pupil of the optical imaging system eccentrically with a second distance to the optical axis thereof, the second distance being different from the first distance. Further, the optical measuring system is configured to receive a first reflection light beam that is created by a partial reflection of the first measuring light beam on a surface of the cover slip through the optical imaging system, receive a second reflection light beam that is created by a partial reflection of the second measuring light beam on the surface of the cover slip through the optical imaging system, and direct the first and second reflection light beams onto the position sensitive detector. The control unit is configured to record the positions of the first and second reflection light beams on the position sensitive detector, and to determine an aberration based on the recorded positions of the first and second reflection light beams.

The cover slip may be any transparent pane that covers or supports a sample to be examined with the microscope such as a cover glass or a bottom of a petri dish. Preferably, the optical imaging system comprises an objective lens. The microscope drive can be used in particular to adjust the focal position of the optical imaging system along the optical axis thereof.

Spherical aberration of the optical imaging system generally manifests itself in that light beams passing through the optical imaging system have different focal positions along the optical axis of the optical imaging system depending on their incident position in the entrance pupil of the optical imaging system. In particular, light beams passing through outer annular pupil zones have a different focal position along the optical axis of the optical imaging system compared to light beams passing through inner annular pupil zones, i.e. annular pupil zones located closer to the optical axis than the outer annular pupil zones. This fact is used in order to determine the spherical aberration of the optical imaging system up to the reflecting surface of the cover slip as described below. Especially, the afore-mentioned reflecting surface may be the coverslip surface which faces the sample.

The two measuring light beams are directed into the entrance pupil of the optical imaging system at different heights, i.e. at different distances from the optical axis of the optical imaging system. Due to the spherical aberration present in the optical imaging system, the two measuring light beams will intersect with the surface of the cover slip at different points. The two reflection light beams created by the partial reflection of the two measuring light beams on the surface of the cover slip are received by the optical imaging system. The reflection light beams exit the optical imaging system at different heights. The height of each exiting reflection light beam depends on the position and/or angle the corresponding measuring light beam intersects with the surface of the cover slip. Thus, the positions and/or angles are themselves a result of the spherical aberration present in the optical imaging system and of its focus position. Thus, the different heights of the exiting reflection light beams are characteristic of the spherical aberration present in the optical imaging system, and the spherical aberration can be easily derived from height of each exiting reflection light beam after or in conjunction with correction for the focus position. In order to determine the different heights of the reflection light beams, the reflection light beams are directed onto the position sensitive detector, and the positions of the first and second reflection light beams on the position sensitive detector are recorded. Thus, the microscope allows for an easy and accurate determination of the spherical aberration.

In a preferred embodiment, the control unit is configured to adjust the microscope drive step-wise, record positions of the first and second reflection light beams on the position sensitive detector for each step, adjust the correction means stepwise, record positions of the first and second reflection light beams on the position sensitive detector for each step, and determine an aberration based on the recorded positions of the first and second reflection light beams.

The focal position along the optical axis of the optical imaging system of each of the two measuring light beams and thus the position on the position sensitive sensor of the corresponding reflection light beam depend on both a setting of the microscope drive and a setting of the correction means. Thus, in order to correctly determine the spherical aberration, it is necessary to know the influence of both the setting of the microscope drive and the setting of the correction means on the positions of the two reflection light beams. In this embodiment the spherical aberration is determined from multiple positions of the first and second reflection light beams for a variety of settings of the correction means and the microscope drive. Thus, the influence of the setting of the microscope drive and the setting of the correction means can be eliminated from the determination. This allows for a more reliable determination of the spherical aberration.

In another preferred embodiment the control unit is configured to obtain a first functional dependency between the position of the first reflection light beam on the position sensitive detector, the distance between the cover slip and the optical imaging system along the optical axis thereof, and a control variable of the adjustable correction means, and to obtain a second functional dependency between the position of the second reflection light beam on the position sensitive detector, the distance between the cover slip and the optical imaging system along the optical axis thereof, and the control variable of the adjustable correction means. Further, the control unit is configured to determine the aberration based on the first and second functional dependencies.

In this embodiment, the first and second functional dependencies are for example determined from recorded positions of the first and second reflection light beams. In this case, a system of equations is generated that takes the general form shown in formula (1) where x is a vector of the positions of the first and second reflection light beams on the position sensitive detector, p is a vector including the settings of the correction means and the microscope drive, and A is an operator relating x and p and represents optical behavior of the optical imaging system.

$$x = A \cdot p \tag{1}$$

It is advantageous to assume that the first and second functional dependencies are linear functions. In this case, formula (1) reduces to a system of linear equation that can be solved by a number of known analytical or numerical algorithms. Further, it is advantageous to solve formula (1) for multiple positions of the first and second reflection light beams and for a variety of settings of the correction means and the microscope drive. In this case, formula (1) is an overdetermined system of equations that can be solved faster and more reliably. Thus, speeding up the determination of the spherical aberration is possible. The first and second functional dependencies may also be obtained from a model that describes the optical behavior of the microscope or the optical imaging system in particular. This allows to put certain constraints on formula (1), thereby restricting the number of possible solutions. In particular, in this embodiment formula (1) may be a system of only two equations. This speeds up the determination of the spherical aberration even further. The first and second functional dependencies may be obtained from a database in which the functional dependencies are saved. This database may be stored for example on a memory element of the control unit or on a remote memory element such as a server or a cloud server that can be accessed via a data communication network such as the internet or a local area network (LAN).

In another preferred embodiment, the control unit is configured to correct the aberration by adjusting the correction means and the microscope drive based on the first and second functional dependencies such that the first reflection light beam falls onto a first predetermined area of the position sensitive detector and the second reflection light beam falls onto a second predetermined area of the position sensitive detector. As described above, the positions of the first and second reflection light beam on the position sensitive sensor are directly related to the spherical aberration and the position of the focal point of the optical imaging system. It is thus possible to predetermine a first position and a second position on the position sensitive sensor such that no spherical aberration is present and the optical imaging system is focused on the surface of the cover slip, when the first and second reflection light beams fall onto the first and second positions, respectively. This can be done by performing a reference measurement. For this purpose, a reference cover glass is used whose thickness and refractive index are matched to the optical imaging system. The positions of the first and second reflection light beams on the position sensitive detector are recorded and saved as the first and second positions, respectively.

In this preferred embodiment, the first and second functional dependencies are used to adjust the correction means and the microscope drive such that first and second reflection light beams fall onto the first and second areas, respectively, the first and second area containing the first and second positions. Thus, the first and second area represent a tolerance range around the first and second positions. It is therefore possible to reliably and repeatably correct the aberration within a predetermined tolerance range.

Preferably, the control unit is configured to correct the aberration by determining a value of the control variable for adjusting the correction means and a value for a control variable for adjusting the microscope drive based on the determined aberration, and adjusting the correction means and the microscope drive according to the determined values of their respective control variables. Directly determining the control variables from the aberrations eliminates the need for a subsequent recording of the positions of the first and second reflection light beam on the position sensitive sensor as in the embodiment described above. Thus, depending on the recording speed of the position sensitive sensor, the correction of the spherical aberration can be done faster.

In another preferred embodiment, the control unit is configured to determine the optical thickness of the cover slip based on the determined value for the control variable for adjusting the corrections means. On the basis of the determined optical thickness, the mechanical thickness of the cover slip can then be calculated using a correction factor obtained experimentally from other cover slips. The mechanical thickness can be used to adjust the microscope drive such that the focal point of the optical imaging system is located within the specimen.

In another preferred embodiment, the control unit is configured to correct the aberration by adjusting the correction means and the microscope drive until the first reflection light beam falls onto the first predetermined area of the position sensitive detector and the second reflection light beam falls onto the second predetermined area of the position sensitive detector. Instead of solving formula (1) in order to obtain the first and second functional dependencies for adjusting the correction means and the microscope drive, the aberration may be corrected by, e.g. randomly, adjusting the correction means and the microscope drive. As described above, when the first reflection light beam falls onto the first predetermined area of the position sensitive detector and the second reflection light beam falls onto the second predetermined area of the position sensitive detector, no spherical aberration is present, and the optical imaging system is focused on the surface of the cover slip.

In another preferred embodiment, the first distance is smaller than the second distance, and the control unit is configured to correct the aberration by adjusting the microscope drive in a first step until the first reflection light beam falls onto the first predetermined area of the position sensitive detector, adjusting the correction means in a second step until the second reflection light beam falls onto the second predetermined area of the position sensitive detector, and repeating the first and second steps until the first reflection light beam falls onto the first predetermined area of the position sensitive detector and the second reflection light beam falls onto the second predetermined area of the position sensitive detector at the same time.

Since the first measuring light beam enters the optical imaging system closer to the optical axis thereof than the second measuring light beam, the first measuring light beam is less affected by spherical aberration. Thus, the position of the first reflection light beam on the position sensitive detector mainly corresponds to the focal position of the optical imaging system. Accordingly, in the first step it is checked if the specimen is in focus. If not, the microscope drive is adjusted to bring the specimen into focus. The second measuring light beam enters the optical imaging system farther from the optical axis thereof than the first measuring light beam and is thus affected more by spherical aberration. The position of the second reflection light beam on the position sensitive detector therefore mainly corresponds to the amount of spherical aberration present in the optical imaging system. Thus, in the second step it is checked if spherical aberration is present. As mentioned above, the focal position along the optical axis of the optical imaging system of each of the two measuring light beams depends on both a setting of the microscope drive and a setting of the correction means. This means, that adjusting the correction means might result in a defocus that requires the microscope drive to be adjusted and that adjusting the microscope drive might result in a spherical aberration that requires the corrections means to be adjusted. However, the position of the first reflection light beam on the position sensitive detector is more sensitive to the focal position of the optical imaging system, and the position of the second reflection light beam on the position sensitive detector is more sensitive to the setting of the correction means. This means that the amount of required adjustment gets smaller with each iteration. This is used in this preferred embodiment to devise a fast and reliable scheme for correcting the aberration with an iterative method without needing any calculation.

In another preferred embodiment, the first distance is smaller than the second distance, and the control unit is configured to correct a defocus aberration by adjusting the microscope drive until the first reflection light beam falls onto a third predetermined area of the position sensitive detector. In this preferred embodiment the first measuring light beam is used as an autofocus measuring light beam. As mentioned above, the position of the first reflection light beam on the position sensitive detector is directly related to the focal position of the optical imaging system. The position of the first reflection light beam on the position sensitive detector may therefore be used in order to set the focal position of the optical imaging system by adjusting the microscope drive such that the position of the first reflection light beam on the position sensitive detector falls onto a third predetermined area of the position sensitive detector. In particular, the third predetermined area may be chosen such that the focal point of the optical imaging system lies within the specimen. This allows for aberration free imaging of a plane inside the specimen.

In another preferred embodiment, the first distance is smaller than the second distance, and the control unit is configured to correct a spherical aberration by adjusting the correction means until the second reflection light beam falls onto a fourth predetermined area of the position sensitive detector. In this preferred embodiment the second measuring light beam is used in order to correct a spherical aberration, e.g. if the focal point of the optical imaging system is determined by other means. This allows for a flexible use of the microscope according to the preferred embodiment.

In another preferred embodiment, the microscope comprises a measuring light source configured to emit measuring light. The optical measuring system comprises a first aperture element and a second aperture element that are arranged in a light path between the measuring light source and the optical imaging system. The first aperture element has an aperture opening arranged eccentrically with a third distance to the optical axis of the optical measuring system. The second aperture element has an aperture opening arranged eccentrically with a fourth distance d4 to the optical axis of the imaging optics that is different from the third distance. The first and second apertures elements form the first and second measuring light beams from the measuring light, respectively. Thus, the first and second measurement light beams can be created in a simple way. The microscope according to this preferred embodiment can be produced at relatively low cost.

Preferably, the measuring light source emits the measuring light in an infrared wavelength range. This has the advantage that the reflection light beams generated by the measuring light beams on the surface of the cover slip are not visible to the human eye and therefore do not interfere with the microscopic examination of the specimen. However, it is also possible to use a measuring light source that emits light in the visible wavelength range. Chromatic dependencies of the spherical correction of the optical system can be integrated into the reference measurements.

In a preferred embodiment the position sensitive detector comprises a line sensor or a one-dimensional array of sensors elements. This is a cost-effective way for realizing the position sensitive detector, while still being able to record both the positions of the first and second reflection light beams by means of a single sensor. As an alternative, the position sensitive detector may comprise a two-dimensional array of sensor elements.

According to another aspect, a method for determining an aberration in a microscope is provided, said microscope comprising an optical imaging system configured to image a specimen comprising a cover slip, adjustable correction means, a microscope drive configured to adjust the distance between the cover slip and the optical imaging system along the optical axis thereof, and a position sensitive detector. The method comprising the following steps: forming a first measuring light beam and a second measuring light beam; directing the first measuring light beam into an entrance pupil of the optical imaging system eccentrically with a first distance to the optical axis of the optical imaging system; directing the second measuring light beam into the entrance pupil of the optical imaging system eccentrically with a second distance to the optical axis of the optical imaging system, the second distance being different from the first distance; creating a first reflection light beam by partially reflecting the first measuring light beam on a surface of the cover slip, creating a second reflection light beam by partially reflecting the second measuring light beam on the surface of the cover slip; directing the first and second reflection light beams onto the position sensitive detector; recording the positions of the first and second reflection light beams on the position sensitive detector; and determining an aberration based on the recorded positions of the first and second reflection light beams on the position sensitive detector.

The method has the same advantages as the microscope claimed and can be supplemented using the features of the dependent claims directed at the microscope.

FIG. 1 shows a microscope 100 comprising an optical imaging system 102, which comprises adjustable correction means 104, for example a correction lens. The microscope 100 further comprises a microscope drive 106, a position sensitive detector 108, an optical measuring system 110, and a control unit 112. The microscope 100 according to FIG. 1 is exemplarily designed as an upright microscope.

The optical imaging system 102 may comprise an objective lens which is arranged above a specimen 114. The specimen 114 comprises an object 115 to be examined with the microscope 100, said object 115 being embedded inside an optically transparent medium 116. Further, the specimen 114 comprises a cover slip 118 arranged on top of the object 115 and the medium 116 in which the object 115 is embedded. In order to increase the effective numerical aperture of the optical imaging system 102, an immersion medium 120 such as an immersion oil or water is arranged between the cover slip 118 and the optical imaging system 102.

In the embodiment according to FIG. 1, the microscope drive 106 is configured to move the optical imaging system 102 along an optical axis O1 thereof. By moving the optical imaging system 102 along its optical axis O1, a distance between the optical imaging system 102 and the specimen 114 is varied. Thereby, the focal point of the optical imaging system 102 is moved through the specimen 114 along the optical axis O1.

The optical measuring system 110 is arranged at least in part in an optical path of the optical imaging system 102. In this respect, it is to be noted that the optical measuring system 110 is illustrated purely schematically in FIG. 1. The optical measuring system 110 will be described in more detail below with reference to FIG. 2. The control unit 112 is connected to the optical imaging system 102, to the microscope drive 106, to the position sensitive detector 108, and to the optical measuring system 110.

Figure 2:
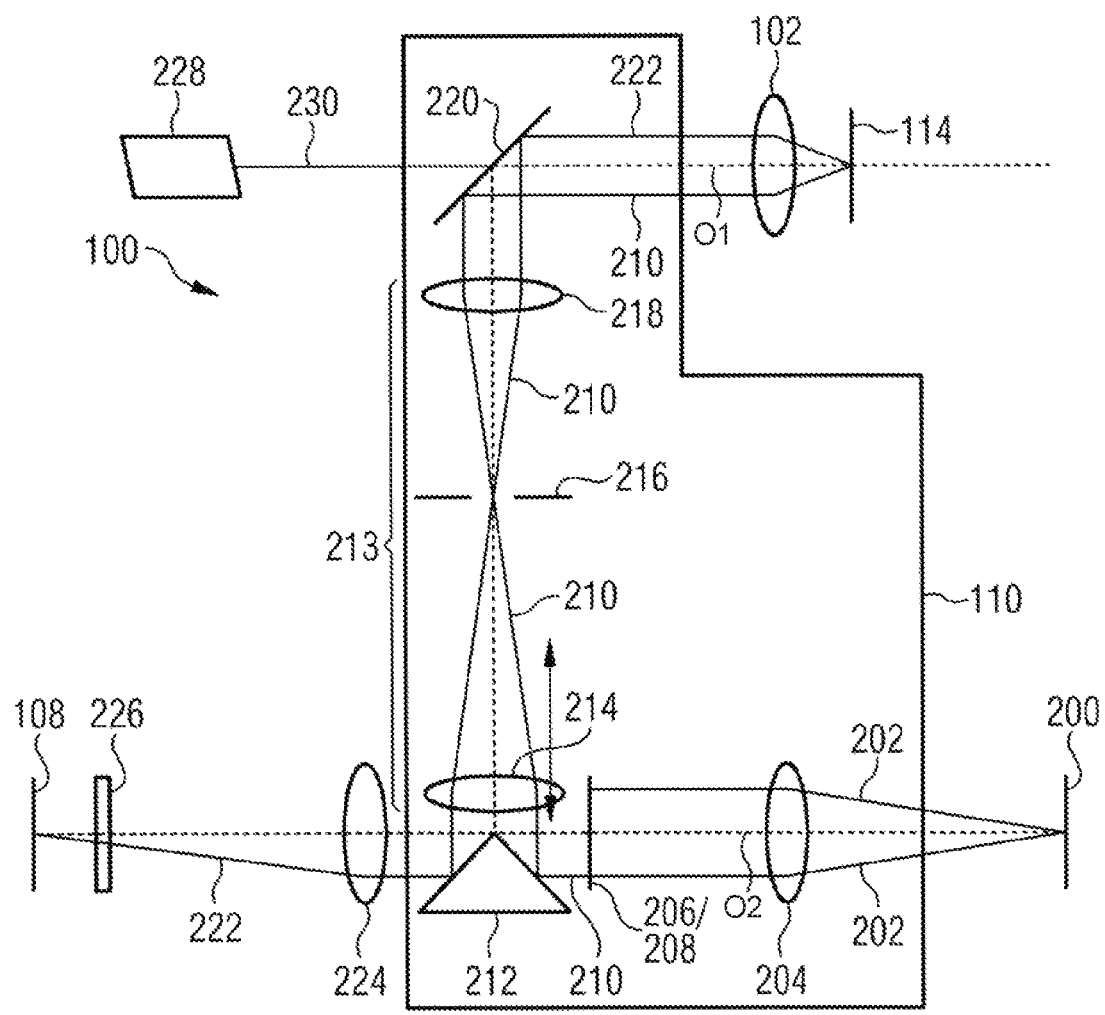
FIG. 2 is a schematic diagram showing an optical measuring system of the microscope according to FIG. 1.
Figure 3:
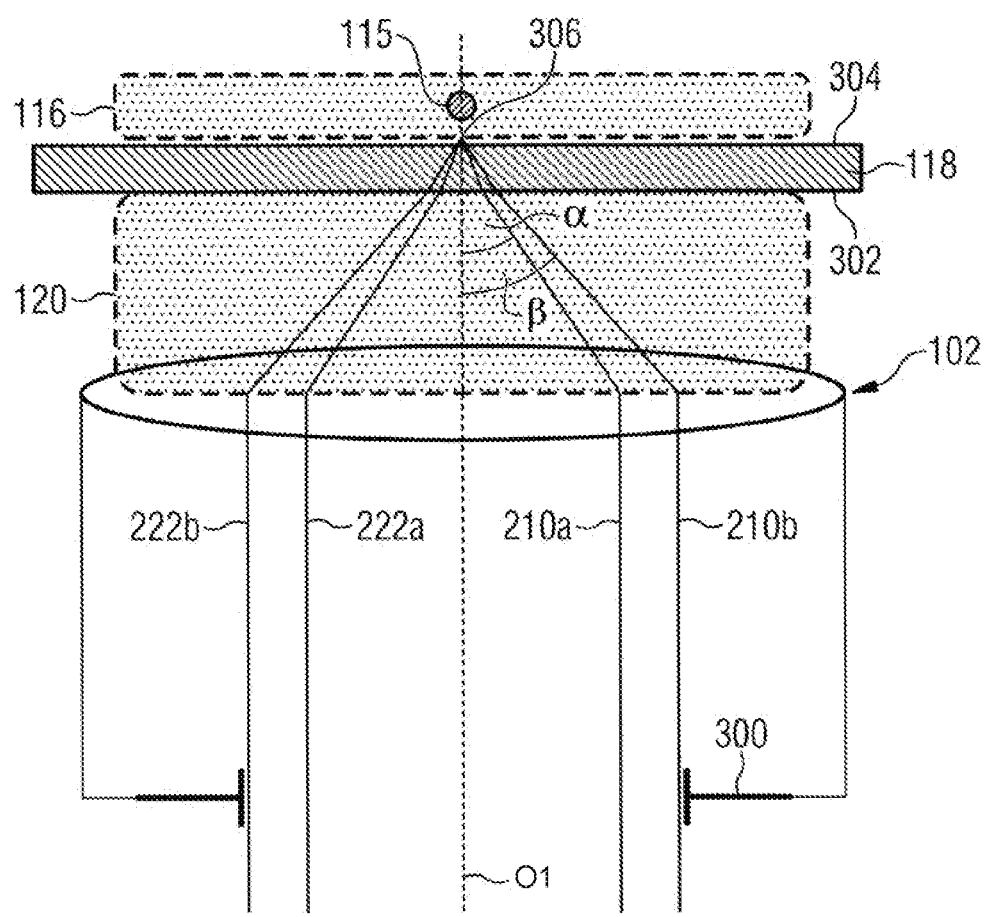
FIG. 3 is a schematic diagram showing an optical imaging system of the microscope according to FIG. 1 and a specimen that is examined by means of the microscope.

FIG. 2 is a diagram illustration the optical measuring system 110 of the microscope 100 in more detail. Further, reference is made to FIG. 3 showing the measuring geometry at the specimen 114.

The configuration according to FIG. 2 comprises a measuring light source 200 that is configured to emit measuring light 202. The measuring light 202 enters the optical measuring system 110 via an optical illumination system 204. The optical illumination system 204 directs the measuring light 202 onto a first aperture element 206 and a second aperture element 208. The first and second aperture elements 206, 208 are configured to form a first measuring light beam 210a and a second measuring light beams 212 from the measuring light 202, respectively. As can be seen in FIG. 3, the first and second measuring light beams 210a, 210b have different distances from the optical axis O1 of the optical imaging system 102 (and are designated by a common reference sign 210 in FIG. 2). The first and second aperture elements 206, 208 are described below in more detail with reference to FIGS. 4a and 4b.

The first and second measuring light beams 210 are directed by a prism 212 into an optical transport system 213. The optical transport system 213 comprises a focusing lens 214, a field diaphragm 216, and a transport lens 218. The optical transport system 213 transports the first and second measuring light beams 210 towards a dichroitic beam splitter 220 that directs the first and second measuring light beams 210 into the optical imaging system 102. Both measuring light beams 210 pass through the optical imaging system 102 and are directed onto a surface 304 of the cover slip 118 of the specimen 114 (see FIG. 3). A first reflection light beam 222a is formed by a partial reflection of the first measuring light beam 210a on the surface of the cover slip 118. Likewise, a second reflection light beam 222b is formed by a partial reflection of the second measuring light beam 210b on the surface of the cover slip 118. Both reflection light beams are designated by the same reference sign 222 in FIG. 2.

The first and second reflection light beams 222 are received by the optical imaging system 102 and directed onto the dichroitic beam splitter 220. The dichroitic beam splitter 220 directs the first and second reflection light beams 222 into the optical transport system 213. The optical transport system 110 guides the first and second reflection light beams 222 back to the prism 212. The prism 212 then directs the first and second reflection light beams 222 onto an optical detection system 224. The optical detection system 224 directs the first and second reflection light beams 222 via an optical filter 226 onto the position sensitive detector 108. The optical filter 226 is configured to block any wavelengths other than the wavelengths of the reflection light beams 222. Thus, the optical filter 226 prevents stray light from falling onto the position sensitive detector 108.

The position of the first and second reflection light beams 222 on the position sensitive detector 108, that is the position at which the first and second reflection light beams 222 intersect with a planar light receiving surface of the position sensitive detector 108, are characteristic of a spherical aberration that is created between an entrance pupil 300 (see FIG. 3) of the optical imaging system 102 and the surface 304 of the cover slip 118 at which the measuring light beams 210 are reflected. Thus, it is possible to determine the spherical aberration from the position of the first and second reflection light beams 222 on the position sensitive detector 108.

For sake of completeness, FIG. 2 also shows schematically the coupling of a tube 228 of the microscope 100 to the optical measuring system 110 via the dichroitic beam splitter 220. Accordingly, in the present embodiment the dichroitic beam splitter 220 serves to direct the reflection light beams 222 in the optical transport system 213 and to transmit visible detection light 230 used for the actual microscopic imaging, which is guided by the optical imaging system 102 from the object 115 of the specimen 114 in the direction of the dichroitic beam splitter 220. The visible detection light 230 may subsequently be directed into an ocular for observing the object 115 by eye or onto a detector element for forming an image of the object 115.

More concretely referring to FIG. 3, the first and second measuring light beams 210a, 210b enter the optical imaging system 102 via the entrance pupil 300. The first and second measuring light beams 210a, 210b have different heights, i.e. their respective centers have different distances from the optical axis O1 of the optical imaging system 102 when entering through the entrance pupil 300. Therefore, the first and second measuring light beams 210a, 210b are directed by the optical imaging system 102 towards the cover slip 118 at different angles. The first measuring light beam 210a encloses a first angle α with the optical axis O1 of the optical imaging system 102. Likewise, the second measuring light beam 210b encloses a second angle β with the optical axis O1 of the optical imaging system 102, said second angle β being larger than the first angle α. The first and second measuring light beams 210a, 210b pass through the immersion medium 120 and intersect a first surface 302 of the cover slip 118 at different points. Passing through the first surface 302, both measuring light beams 210a, 210b are refracted towards the surface normal. In the embodiment according to FIG. 3, the first and second measuring light beams 210a, 210b fall onto a second surface 304 of the cover slip 118 that is arranged opposite to the first surface 302 in a surface point 306 after passing through the cover slip 118. In other words, the optical imaging system 102 focusses the first and second measuring light beams onto the point 306 of the second surface 304 of the cover slip 118 (if no spherical aberration is present).

In the embodiment according to FIG. 3, the first and second reflection light beams 222a, 222b are created by a partial reflection of the first and second measuring light beams 210a, 210b on the second surface 304 of the cover slip 118, respectively. In another embodiment, the first and second reflection light beams 222a, 222b may be formed by a partial reflection of the first and second measuring light beams 210a, 210b on the first surface 302 of the cover slip 118, respectively.

The first and second reflection light beams 222a, 222b pass through the cover slip 118 and are refracted towards the surface normal at the points where the first and second reflection light beams 222a, 222b intersect with the first surface 302 of the cover slip 118. After passing through the immersion medium 120, the first and second reflection light beams 222a, 222b are received by the optical imaging system 102. Then, the first and second reflection light beams 222a, 222b exit the optical imaging system 102 through the entrance pupil 300. The height of the first reflection light beam 222a (i.e. its distance from the optical axis O1) at the entrance pupil 300 depends on the first angle α that is enclosed by the first measuring light beam 210a and the optical axis O1 of the optical imaging system 102. The first angle α is determined by the height of the first measuring light beam 210a and the spherical aberration that is created between the entrance pupil 300 of the optical imaging system 102 and the second surface 304 of the cover slip 118. Likewise, the height of the second reflection light beam 222b at the entrance pupil 300 depends on the second angle β which itself depends on the height of the second measuring light beam 210b at the entrance pupil 300 and the aforementioned spherical aberration. Since the heights of the first and second measuring light beams 210a, 210b at the entrance pupil 300 are known, it is possible to determine the spherical aberration based on the heights of the first and second reflection light beams 222a, 222b at the entrance pupil 300. In order to determine these heights, the first and second reflection light beams 222a, 222b are directed by the optical measuring system 110 onto the position sensitive detector 108 as described above with reference to FIG. 2. The positions of the first and second reflection light beams 222a, 222b on the position sensitive detector 108 directly correspond to the heights of the first and second reflection light beam at the entrance pupil 300 of the optical imaging system 102. Therefore, the spherical aberration occurring in the optical path between the entrance pupil 300 of the optical imaging system 102 and the second surface 304 of the cover slip 118 can be determined from said positions.

Figure 4A:
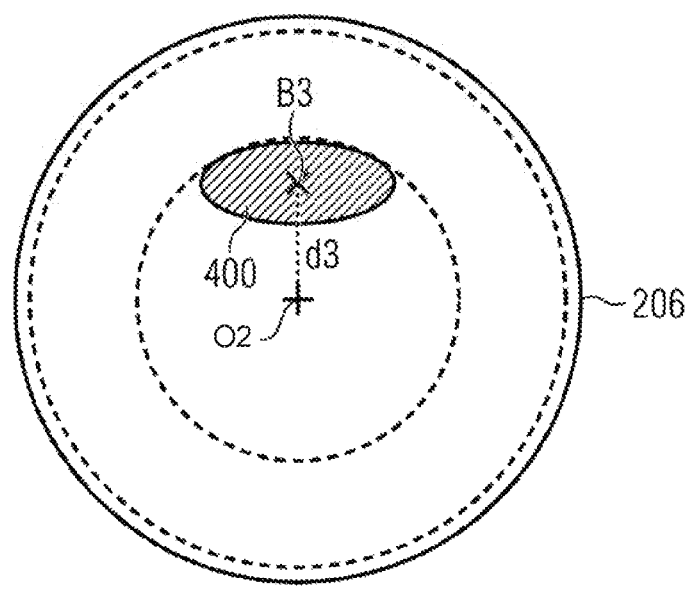
FIG. 4a is a schematic diagram showing a first aperture element of the microscope according to FIG. 1.

FIG. 4a shows the first aperture element 206 of the optical measuring system according to the FIGS. 1 to 3.

The first aperture element 206 has an aperture opening 400 that is arranged eccentrically with a third distance d3 to the optical axis O2 of the optical measuring system 110. This means that a barycenter B3 of the aperture opening 400 is arranged at the third distance d3 from the optical axis O2 of the optical measuring system 110. As already mentioned, the measuring light 202 passing through the aperture opening 400 forms the first measuring light beam 210a.

Figure 4B:
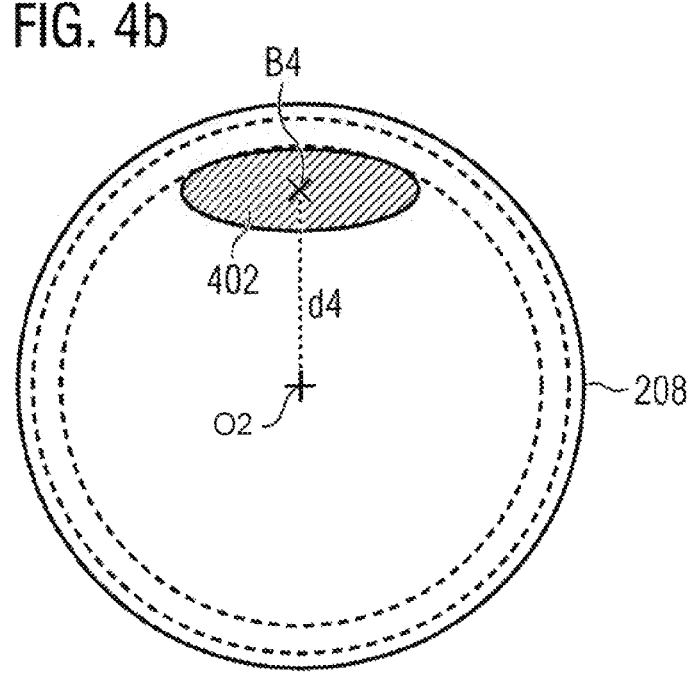
FIG. 4b is a schematic diagram showing a second aperture element of the microscope according to FIG. 1.

FIG. 4b shows the second aperture element 208 of the optical measuring system according to the FIGS. 1 to 3.

The second aperture element 208 has an aperture opening 402 that is arranged eccentrically with a fourth distance d4 to the optical axis O2 of the optical measuring system 110. This means, that a barycenter B4 of the aperture opening 402 is arranged at the fourth distance d4 from the optical axis O2 of the optical measuring system 110, the forth distance d4 being longer than the third distance d3. Consequently, the aperture opening 402 of the second aperture element 208 is arranged further away from the optical axis O2 of the optical measuring system 110 than the aperture opening 400 of the first aperture element 206. The measuring light 202 passing through the aperture opening 402 forms the second measuring light beam 210b.

Figure 5A:
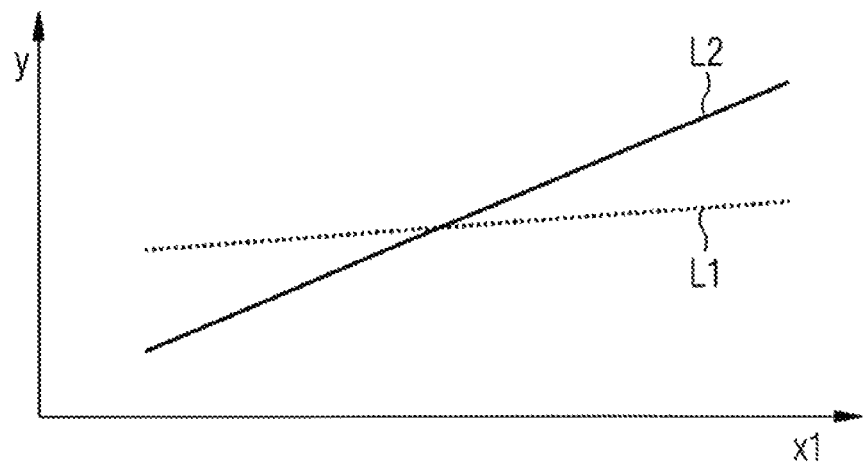
FIG. 5a is a diagram showing the position of first and second reflection light beams on a position sensitive detector of the microscope according to FIG. 1 depending on a setting of a correction means.

FIG. 5a shows a diagram that indicates the position y of the first and second reflection light beams 222a, 222b on the position sensitive detector 108 depending on a setting x1 of the correction means 104, e.g. a distance by which the correction means 104 has been moved along the optical axis O1. The abscissa of the diagram denotes the setting x1 of the correction means 104, and the ordinate denotes the position y on the position sensitive detector 108. A graph indicating the position y of the first reflection light beam 222a on the position sensitive detector 108 as a function of the setting x1 of the correction means 104 is denoted by a dotted line L1. A graph indicating the position y of the second reflection light beam 222b on the position sensitive detector 108 as a function of the setting x1 of the correction means 104 by a solid line L2.

The first measuring light beam 210a propagates through the optical imaging system 102 closer to the optical axis O1 than the second measuring light beam 210b. Consequently, the first measuring light beam 210a and the corresponding first reflection light beam 222a are affected less by the spherical aberration that is created between the entrance pupil 300 of the optical imaging system 102 and the surface of the cover slip 118. Therefore, the position of the first reflection light beam 222a is less affected by the setting of the correction means 104. This is reflected by fact that the slope of the dotted line L1 indicating the position y of the first reflection light beam 222a on the position sensitive detector 108 is smaller than the slope of the solid line L2 indicating the position y of the second reflection light beam 222b on the position sensitive detector 108.

Figure 5B:
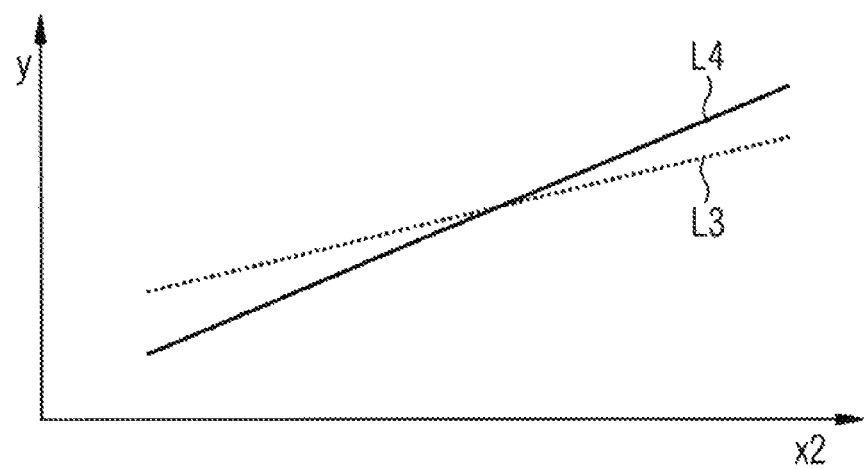
FIG. 5b is a diagram showing the position of the first and second reflection light beams on the position sensitive detector of the microscope according to FIG. 1 depending on a setting of a microscope drive.

FIG. 5b is a diagram that shows the position y of the first and second reflection light beams 222a, 222b on the position sensitive detector 108 depending on the setting x2 of the microscope drive 106, i.e. the distance between the optical imaging system 102 and the surface 302 (or 304) of the cover slip 118. The abscissa of the diagram denotes the setting x2 of the microscope drive 106, and the ordinate denotes the position y on the position sensitive detector 108. A graph indicating the position y of the first reflection light beam 222a on the position sensitive detector 108 as a function of the setting x2 of the microscope drive 106 is denoted by a dotted line L3. A graph indicating the position y of the second reflection light beam 222b on the position sensitive detector 108 as a function of the setting x2 of the microscope drive 106 by a solid line L4.

The positions of the first and second reflection light beams 222a, 222b both depend on the setting x2 of the microscope drive 106. However, the position of the first reflection light beam 222a is affected less than the position of the second reflection light beam 222b. This is reflected by the fact that the slope of the dotted line L3 indicating the position y of the first reflection light beam 222a on the position sensitive detector 108 is smaller than the slope of the solid line L4 indicating the position y of the second reflection light beam 222b on the position sensitive detector 108.

FIGS. 5a and 5b together show that the positions y of the first and second reflection light beams 222a, 222b on the position sensitive detector 108 depend both on the setting x1 of the correction means 104 and the setting x2 of the microscope drive 106, i.e. distance between the optical imaging system 102 and the surface 302, 304 of the cover slip 118. This is further illustrated by FIG. 6.

Figure 6:
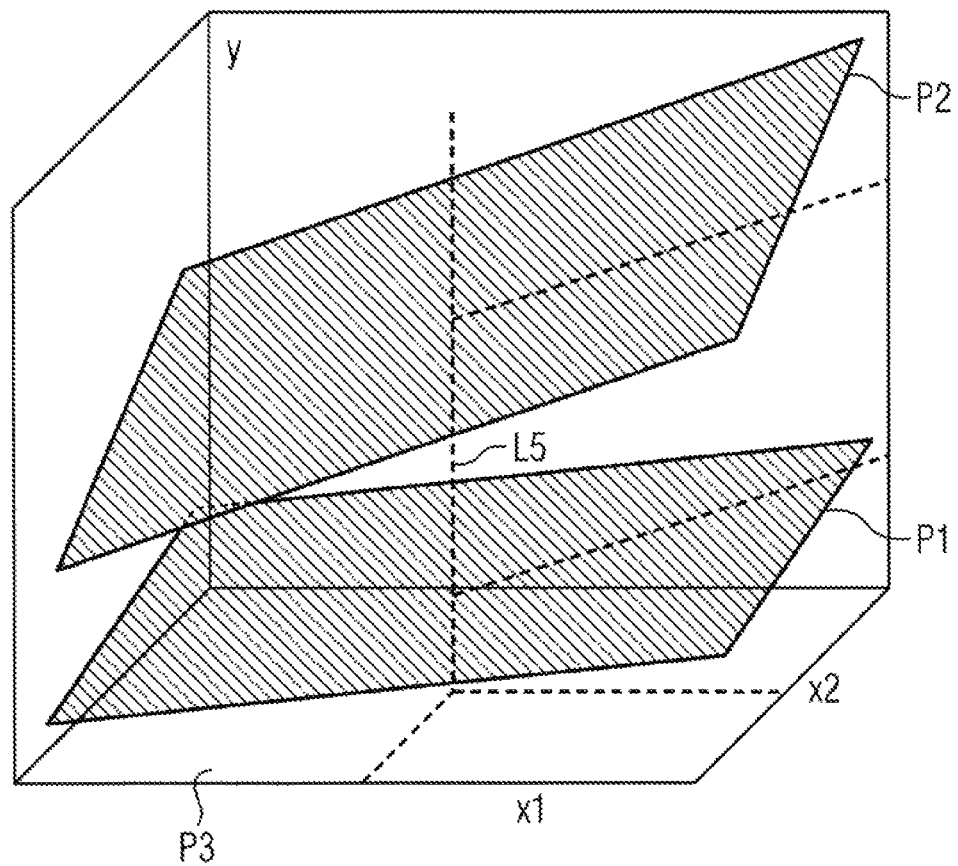
FIG. 6 is a diagram showing the positions of the first and second reflection light beams on the position sensitive detector of the microscope according to FIG. 1 depending on the setting of the correction means and the setting of the microscope drive.

FIG. 6 is a three-dimensional diagram that shows the positions y of the first and second reflection light beams 222a, 222b on the position sensitive detector 108 depending on the setting x1 of the correction means 104 and the setting x2 of the microscope drive 106. The abscissa shows the setting x1 of the correction means 104, the ordinate shows the setting x2 of the microscope drive 106, and the applicate shows the position y on the position sensitive detector 108.

A first plane P1 shows the position of the first reflection light beam 222a on the position sensitive detector 108, and the second plane P2 shows the position of the second reflection light beam 222b on the position sensitive detector 108. A nominal position for the first and second reflection light beams 222a, 222b on the position sensitive detector 108 are denoted in the diagram by dotted lines L5. As has been described above with reference to FIGS. 5a and 5b, the first reflection light beam 222a is affected less by both the setting of the correction means 104 and the microscope drive 106. This is reflected by the fact that the first plane P1 is more parallel to a horizontal reference plane P3 which is spanned by the abscissa and the ordinate than the second plane P2.

Figure 7:
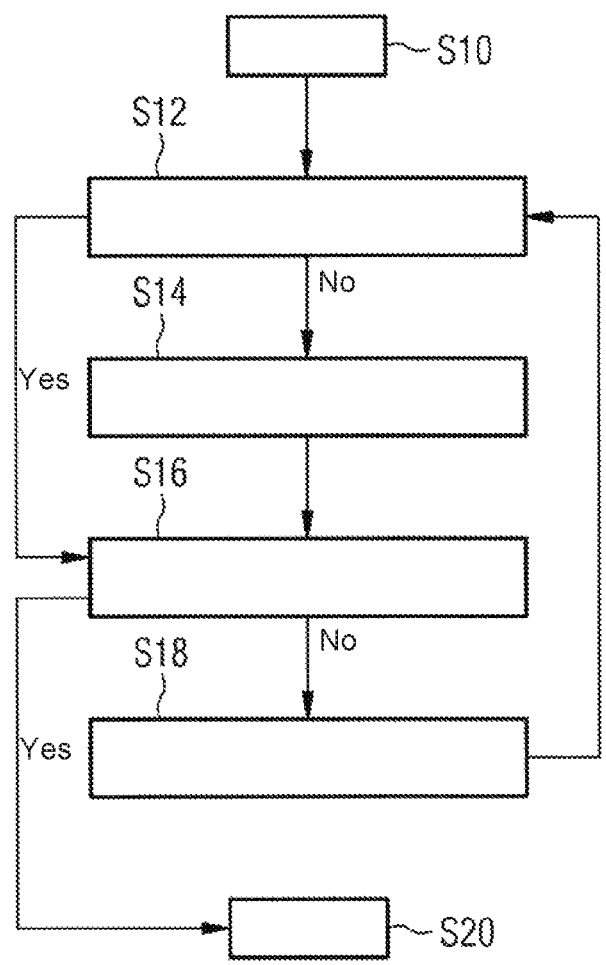
FIG. 7 is a flowchart of a process for correcting the spherical aberration by means of the microscope according to FIGS. 1 to 6.

FIG. 7 is a flowchart of a process for correcting the spherical aberration by means of the microscope 100 according to FIGS. 1 to 6. The process starts in step S10. Then, in step S12, the control unit 112 checks if the position of the first reflection light beam 222a on the position sensitive detector 108 is within a first area. The first area is a tolerance region around a position of the first reflection light beam 222a on the position sensitive detector 108 which corresponds to the focal point of the optical imaging system 102 being on the surface 304 of the cover slip 118. If the position of the first reflection light beam 222a is within the first area, the process is continued in step S16. If the position of the first reflection light beam 222a is not within the first area, the microscope drive 106 is adjusted in step S14 until the aforementioned position is within the first area. Then, in step S16, the control unit 112 checks if the position of the second reflection light beam 222b on the position sensitive detector 108 is within a second area. The second area is a tolerance region around a position of the second reflection light beam 222b on the position sensitive detector 108 which corresponds to a case in which no spherical aberration is created between the entrance pupil 300 of the optical imaging system 102 and the surface 302 (or 304) of the cover slip 118. If the position of the first reflection light beam 222a is within the first area, the process is stopped in step S20. If the position of the first reflection light beam 222a is not within the first area, the correction means 104 is adjusted in step S18 until the aforementioned position is within the second area. The process is then repeated starting from S12 to ensure that the position of the first reflection light beam 222a is within the first area and the position of the second reflection light beam 222b on the position sensitive detector 108 is within a second area without any changes of the microscope drive 106 or the correction means 104 between the two measurements. The process is then stopped step S20.

Figure 8:
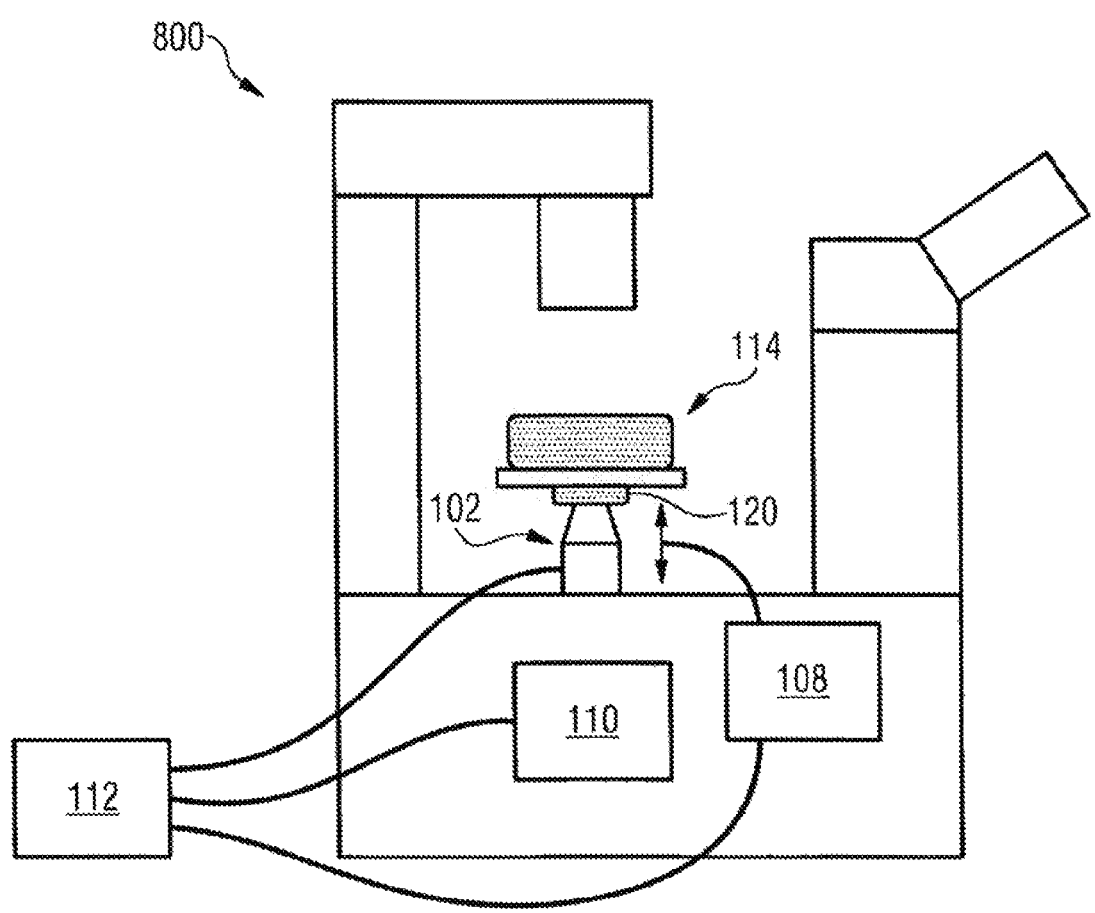
FIG. 8 is schematic diagram of a microscope according to another embodiment.

FIG. 8 shows a microscope 800 according to a modified embodiment. The microscope 800 according to FIG. 8 differs from the microscope 100 according to FIG. 1 in that the microscope 800 according to FIG. 8 is an inverse microscope. Accordingly, the optical imaging system 102 is arranged below the specimen 114. Equal or equivalent elements are designated by the same reference signs.

In the embodiment according to FIG. 8, the microscope drive 106 adjusts the distance between the optical imaging system 102 and the surface of the cover slip 118 by moving the specimen 114 along the optical axis of the optical imaging system 102.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 microscope
102 optical imaging system
104 correction means
106 microscope drive
108 position sensitive detector
110 optical measuring system
112 control unit
114 specimen
115 object
116 medium
118 cover slip
120 immersion medium
200 light source
202 measurement light
204 optical illumination system
206, 208 aperture element
210, 210a, 210b measurement light beam
212 prism
213 optical transport system
214 focusing lens
216 field diaphragm
218 transport plans
220 dichroitic beam splitter
222, 222a, 222b reflection Light Beam
224 optical detection system
226 optical Filter
300 entrance pupil
302, 304 surface
306 point
400, 402 aperture opening
500 diagram
502 abscissa
504 ordinate
506 diagram
508 abscissa
510 ordinate
800 microscope
B3, B4 barycenter
L1, L2, L3, L4, L5 line
O1, O2 optical axis
P1, P2, P3 plane
x1, x2 setting
y position
α, β angle

What is claimed is:

1. A microscope, comprising:
an optical imaging system having an adjustable corrector and being configured to image a specimen that has a cover slip;
a microscope drive configured to adjust a distance between the cover slip and the optical imaging system along an optical axis of the optical imaging system;
a position sensitive detector;
an optical measuring system configured to:
form a first measuring light beam and a second measuring light beam,
direct the first measuring light beam into an entrance pupil of the optical imaging system eccentrically with a first distance to the optical axis of the optical imaging system,
direct the second measuring light beam into the entrance pupil of the optical imaging system eccentrically with a second distance to the optical axis of the optical imaging system, the second distance being different from the first distance,
receive a first reflection light beam that is created by a partial reflection of the first measuring light beam on a surface of the cover slip through the optical imaging system,
receive a second reflection light beam that is created by a partial reflection of the second measuring light beam on the surface of the cover slip through the optical imaging system, and
direct the first and second reflection light beams onto the position sensitive detector; and
a control unit configured to:
record positions of the first and second reflection light beams on the position sensitive detector, and
determine an aberration based on the recorded positions of the first and second reflection light beams.

2. The microscope according to claim 1, wherein the control unit is configured to:
adjust the microscope drive stepwise,
record positions of the first and second reflection light beams on the position sensitive detector for each step,
adjust the adjustable corrector stepwise,
record positions of the first and second reflection light beams on the position sensitive detector for each step, and
determine an aberration based on the recorded positions of the first and second reflection light beams.

3. The microscope according to according to claim 1, wherein the control unit is configured to determine the aberration by:
obtaining a first functional dependency among the position of the first reflection light beam on the position sensitive detector, the distance between the cover slip and the optical imaging system along the optical axis of the optical imaging system, and a control variable of the adjustable corrector;
obtaining a second functional dependency among the position of the second reflection light beam on the position sensitive detector, the distance between the cover slip and the optical imaging system along the optical axis of the optical imaging system, and the control variable of the adjustable corrector; and
determining the aberration based on the first and second functional dependencies.

4. The microscope according to claim 3, wherein the control unit is configured to:
determine the first functional dependency and the second functional dependency, and
determine the aberration on an assumption that the first and second functional dependencies are linear functions.

5. The microscope according to claim 3, wherein the control unit is configured to correct the aberration by:
adjusting the adjustable corrector and the microscope drive based on the first and second functional dependencies such that the first reflection light beam falls onto a first predetermined area of the position sensitive detector and the second reflection light beam falls onto a second predetermined area of the position sensitive detector.

6. The microscope according to claim 1, wherein the control unit is configured to correct the aberration by:

determining a value of a control variable for adjusting the adjustable corrector and a value for a control variable for adjusting the microscope drive based on the determined aberration, and adjusting the adjustable corrector and the microscope drive according the determined values of their respective control variables.

7. The microscope according claim 6, wherein the control unit is configured to determine an optical thickness of the cover slip based on the determined value for the control variable for adjusting the adjustable corrector.

8. The microscope according to claim 1, wherein the control unit is configured to correct the aberration by adjusting the adjustable corrector and the microscope drive until the first reflection light beam falls onto the first predetermined area of the position sensitive detector and the second reflection light beam falls onto the second predetermined area of the position sensitive detector.

9. The microscope according to claim 8, wherein the first distance is smaller than the second distance, and wherein the control unit is configured to correct the aberration by:

adjusting the microscope drive in a first step until the first reflection light beam falls onto the first predetermined area of the position sensitive detector, adjusting the correction means in a second step until the second reflection light beam falls onto the second predetermined area of the position sensitive detector, and repeating the first and second steps until the first reflection light beam falls onto the first predetermined area of the position sensitive detector and the second reflection light beam falls onto the second predetermined area of the position sensitive detector at the same time.

10. The microscope according to claim 1, wherein the first distance is smaller than the second distance, and wherein the control unit is configured to correct a defocus aberration by:

adjusting the microscope drive until the first reflection light beam falls onto a third predetermined area of the position sensitive detector.

11. The microscope according to claim 1, wherein the first distance is smaller than the second distance, and wherein the control unit is configured to correct a spherical aberration by:

adjusting the adjustable corrector until the second reflection light beam falls onto a fourth predetermined area of the position sensitive detector.

12. The microscope according to claim 1, further comprising a measuring light source configured to emit measuring light, wherein:

the optical measuring system comprises a first aperture element and a second aperture element that are arranged in a light path between the measuring light source and the optical imaging system, the first aperture element has an aperture opening arranged eccentrically with a with a third distance to an optical axis of the optical measuring system, the second aperture element has an aperture opening arranged eccentrically with a with a fourth distance to the optical axis of the optical measuring system that is different from the third distance, and the first and second apertures elements form the first and second measuring light beams from the measuring light, respectively.

13. The microscope according to claim 12, wherein the measuring light source emits the measuring light in an infrared wavelength range.

14. The microscope according to claim 1, wherein the position sensitive detector comprises a line sensor element or a one-dimensional array of sensor elements.

15. A method for determining an aberration in a microscope, the microscope comprising an optical imaging system configured to image a specimen that has a cover slip, an adjustable corrector, a microscope drive configured to adjust a distance between the cover slip and the optical imaging system along an optical axis of the optical imaging system, and a position sensitive detector, the method comprising:

forming a first measuring light beam and a second measuring light beam;

directing the first measuring light beam into an entrance pupil of the optical imaging system eccentrically with a first distance to the optical axis of the optical imaging system;

directing the second measuring light beam into the entrance pupil of the optical imaging system eccentrically with a second distance to the optical axis of the optical imaging system, the second distance being different from the first distance;

creating a first reflection light beam by partially reflecting the first measuring light beam on a surface of the cover slip;

creating a second reflection light beam by partially reflecting the second measuring light beam on the surface of the cover slip;

directing the first and second reflection light beams onto the position sensitive detector;

recording positions of the first and second reflection light beams on the position sensitive detector; and determining an aberration based on the recorded positions of the first and second reflection light beams on the position sensitive detector.

* * * * *